(12) United States Patent
Andison et al.

(10) Patent No.: US 8,740,609 B2
(45) Date of Patent: Jun. 3, 2014

(54) CSD COOLING AND PRESSURIZATION TO KEEP CO$_2$ IN SOLUTION DURING FORMING

(75) Inventors: David Andison, Oakville (CA); Kirk Edward Maki, Tecumseh, MI (US); G. David Lisch, Jackson, MI (US); Reinhard C. J. Luchies, Ann Arbor, MI (US)

(73) Assignee: Amcor Limited, Hawthorn (AU)

( * ) Notice: Subject to any disclaimer, the term of this patent is extended or adjusted under 35 U.S.C. 154(b) by 27 days.

(21) Appl. No.: 13/489,909

(22) Filed: Jun. 6, 2012

(65) Prior Publication Data

US 2012/0315350 A1 Dec. 13, 2012

Related U.S. Application Data

(60) Provisional application No. 61/495,056, filed on Jun. 9, 2011.

(51) Int. Cl.
*B29C 49/46* (2006.01)
*B29C 49/58* (2006.01)

(52) U.S. Cl.
USPC .............. 425/524; 425/526; 425/535

(58) Field of Classification Search
CPC .............. B29C 2049/4626; B29C 2049/465; B29C 2049/4655; B29C 2049/4664; B29C 2049/4833
USPC .............. 425/524, 526, 535; 264/524
See application file for complete search history.

(56) References Cited

U.S. PATENT DOCUMENTS

| | | | |
|---|---|---|---|
| 3,267,185 A | 8/1966 | Freeman, Jr. | |
| 3,268,635 A | 8/1966 | Kraus et al. | |
| 3,395,739 A * | 8/1968 | Friendship | 141/6 |
| 3,882,213 A | 5/1975 | Uhlig | |
| 3,978,232 A * | 8/1976 | Dodsworth et al. | 426/115 |
| 3,993,427 A | 11/1976 | Kauffman et al. | |
| 4,039,641 A | 8/1977 | Collins | |
| 4,177,239 A | 12/1979 | Gittner et al. | |

(Continued)

FOREIGN PATENT DOCUMENTS

| | | |
|---|---|---|
| DE | 4402091 A1 | 8/1994 |
| DE | 20111443 U1 | 9/2001 |

(Continued)

OTHER PUBLICATIONS

International Search Report and Written Opinion dated Sep. 28, 2012 in corresponding International Patent Application No. PCT/US2012/024954 (six pages).

(Continued)

*Primary Examiner* — Robert B Davis
(74) *Attorney, Agent, or Firm* — Harness, Dickey & Pierce, P.L.C.

(57) ABSTRACT

A system for simultaneously forming and filling a container comprising a mold having a mold cavity defining an internal surface and adapted to accept a preform, a pressure source urging a first liquid toward the preform, means for maintaining a desired saturation of gas in solution in the first liquid, and a blow nozzle adapted to receive the first liquid from the pressure source and transfer the first liquid at a pressure into the preform thereby urging the preform to expand toward the internal surface of the mold cavity and create a resultant container, wherein the first liquid remains within the container as an end product.

17 Claims, 7 Drawing Sheets

(56) References Cited

U.S. PATENT DOCUMENTS

| | | |
|---|---|---|
| 4,321,938 A | 3/1982 | Siller |
| 4,432,720 A | 2/1984 | Wiatt et al. |
| 4,457,688 A | 7/1984 | Calvert et al. |
| 4,490,327 A | 12/1984 | Calvert et al. |
| 4,499,045 A | 2/1985 | Obsomer |
| 4,539,172 A | 9/1985 | Winchell et al. |
| 4,725,464 A | 2/1988 | Collette |
| 4,883,631 A | 11/1989 | Ajmera |
| 4,935,190 A | 6/1990 | Tennerstedt |
| 5,129,815 A | 7/1992 | Miyazawa et al. |
| 5,269,672 A | 12/1993 | DiGangi, Jr. |
| 5,389,332 A | 2/1995 | Amari et al. |
| 5,403,538 A | 4/1995 | Maeda |
| 5,540,879 A | 7/1996 | Orimoto et al. |
| 5,599,496 A | 2/1997 | Krishnakumar et al. |
| 5,622,735 A | 4/1997 | Krishnakumar et al. |
| 5,635,226 A | 6/1997 | Koda et al. |
| 5,687,550 A | 11/1997 | Hansen et al. |
| 5,824,237 A | 10/1998 | Stumpf et al. |
| 5,962,039 A | 10/1999 | Katou et al. |
| 6,214,282 B1 | 4/2001 | Katou et al. |
| 6,277,321 B1 | 8/2001 | Vailliencourt et al. |
| 6,355,292 B1 * | 3/2002 | Cheng et al. .............. 426/477 |
| 6,485,670 B1 | 11/2002 | Boyd et al. |
| 6,502,369 B1 | 1/2003 | Andison et al. |
| 6,692,684 B1 | 2/2004 | Nantin et al. |
| 6,729,868 B1 | 5/2004 | Vogel et al. |
| 6,749,415 B2 | 6/2004 | Boyd et al. |
| 6,767,197 B2 | 7/2004 | Boyd et al. |
| 7,141,190 B2 | 11/2006 | Hekal |
| 7,473,388 B2 | 1/2009 | Desanaux et al. |
| 7,553,441 B2 | 6/2009 | Shi |
| 7,914,726 B2 | 3/2011 | Andison et al. |
| 7,981,356 B2 | 7/2011 | Warner et al. |
| 8,017,064 B2 | 9/2011 | Andison et al. |
| 8,096,483 B2 | 1/2012 | Riney |
| 2001/0010145 A1 | 8/2001 | Tawa et al. |
| 2005/0067002 A1 | 3/2005 | Jones |
| 2005/0206045 A1 | 9/2005 | Desanaux et al. |
| 2006/0097417 A1 | 5/2006 | Emmer |
| 2006/0231646 A1 | 10/2006 | Geary, Jr. |
| 2008/0254160 A1 | 10/2008 | Rousseau et al. |
| 2008/0271812 A1 | 11/2008 | Stefanello et al. |
| 2010/0084493 A1 | 4/2010 | Troudt |
| 2010/0213629 A1 | 8/2010 | Adriansens |
| 2010/0303946 A1 | 12/2010 | Voth |
| 2011/0265433 A1 | 11/2011 | Chauvin et al. |

FOREIGN PATENT DOCUMENTS

| | | |
|---|---|---|
| EP | 0849514 | 6/1998 |
| EP | 1529620 | 5/2005 |
| EP | 1577258 | 9/2005 |
| EP | 1688234 | 8/2006 |
| FR | 2887525 | 12/2006 |
| JP | 57123027 | 7/1982 |
| JP | 63-249616 | 10/1988 |
| JP | 09057834 | 3/1997 |
| JP | 09099477 | 4/1997 |
| JP | 10-217258 | 8/1998 |
| JP | 2000-043129 | 2/2000 |
| JP | 2005-254704 | 9/2005 |
| JP | 2005-529002 | 9/2009 |
| KR | 10-0147442 | 8/1998 |
| KR | 2006-0105883 | 10/2006 |
| KR | 10-2006-0128062 | 12/2006 |
| WO | WO02/24435 | 3/2002 |
| WO | WO03/095179 | 11/2003 |
| WO | WO2004/065105 | 8/2004 |
| WO | WO2005/044540 | 5/2005 |
| WO | WO2007/120807 | 10/2007 |
| WO | WO 2009/075791 | 6/2009 |

OTHER PUBLICATIONS

International Search Report and Written Opinion dated Apr. 17, 2012 in corresponding International Patent Application No. PCT/US2011/051284 (nine pages).

International Search Report and Written Opinion dated Apr. 18, 2012 in corresponding International Patent Appliation No. PCT/US2011/051289 (nine pages).

International Search Report and Written Opinion dated May 8, 2012 in corresponding International Patent Application No. PCT/US2011/054584 (six pages).

International Search Report and Written Opinion dated May 9, 2012 in corresponding International Patent Application No. PCT/US2011/056053 (six pages).

International Search Report and Written Opinion dated May 30, 2012 in corresponding International Patent Application No. PCT/US2011/056057 (six pages).

International Search Report and Written Opinion dated Jun. 15, 2012 in corresponding International Patent Application No. PCT/US2011/051293 (eight pages).

International Search Report and Written Opinion dated Oct. 29, 2012 in corresponding International Patent Application No. PCT/US2012/024950 (seven pages).

International Search Report and Written Opinion dated Feb. 15, 2013 in corresponding International Patent Application No. PCT/US2012/041076 (eleven pages).

Supplementary European Search Report dated Jan. 21, 2014 in corresponding European patent application U.S. Appl. No. 12796571 (seven pages).

* cited by examiner

Fig. 10

CSD COOLING AND PRESSURIZATION TO KEEP CO₂ IN SOLUTION DURING FORMING

CROSS-REFERENCE TO RELATED APPLICATIONS

This application claims the benefit of U.S. Provisional Application No. 61/495,056, filed on Jun. 9, 2011. The entire disclosure of the above application is incorporated herein by reference.

FIELD

This disclosure generally relates to forming and filling a plastic container. More specifically, this disclosure relates to an apparatus and method for injection of carbonated liquid (typically a beverage, like soda) that maintains $CO_2$ in solution during formation of plastic containers that employ simultaneous forming and filling techniques.

BACKGROUND

This section provides background information related to the present disclosure which is not necessarily prior art.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc). Once a container has been blown, a commodity may be filled into the container.

Traditionally blow molding and filling have developed as two independent processes, in many cases operated by different companies. In order to make bottle filling more cost effective, some fillers have moved blow molding in house, in many cases integrating blow molders directly into their filling lines. The equipment manufacturers have recognized this advantage and are selling "integrated" systems that are designed to insure that the blow molder and the filler are fully synchronized. Despite the efforts in bringing the two processes closer together, blow molding and filling continue to be two independent, distinct processes. As a result, significant costs may be incurred while performing these two processes separately. Thus, there is a need for a liquid or hydraulic blow molding system suitable for forming and filling a container in a single operation. Moreover, there is a need for a modified preform that is particularly well-suited for molding system that form and fill a container in a single operation

SUMMARY

This section provides a general summary of the disclosure, and is not a comprehensive disclosure of its full scope or all of its features.

Accordingly, the present disclosure teaches a system for simultaneously forming and filling a container comprising a mold having a mold cavity defining an internal surface and adapted to accept a preform, a pressure source urging a first liquid toward the preform, means for maintaining a desired saturation of gas in solution in the first liquid, and a blow nozzle adapted to receive the first liquid from the pressure source and transfer the first liquid at a pressure into the preform thereby urging the preform to expand toward the internal surface of the mold cavity and create a resultant container, wherein the first liquid remains within the container as an end product.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Singe-Step Forming and Filling Discussion

Figure 5:
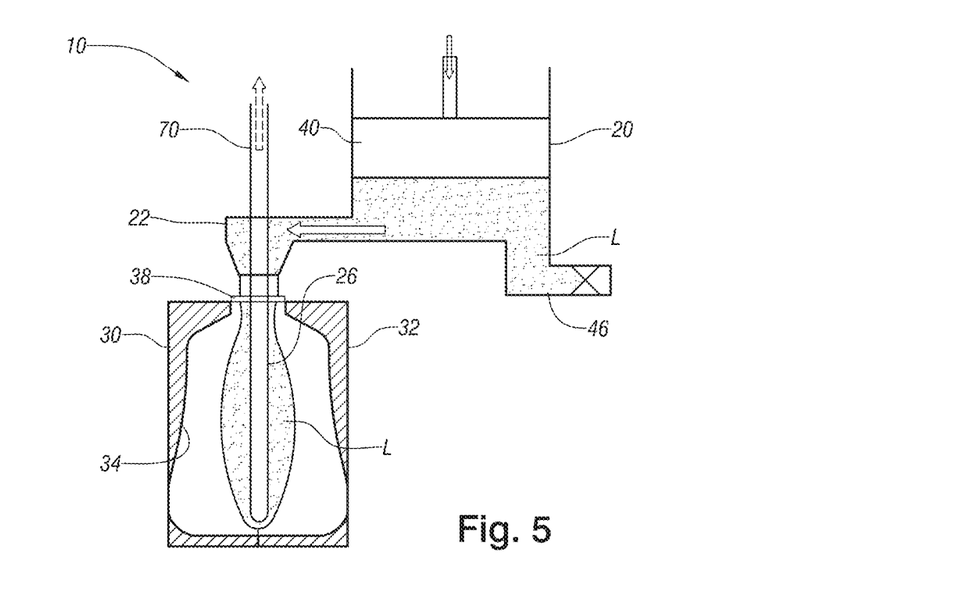
FIG. 5 is a schematic depiction of the system of FIG. 4 wherein the piston-like device drives the liquid from the pressure source to the preform thereby expanding the preform toward the walls of the mold cavity.
Figure 6:
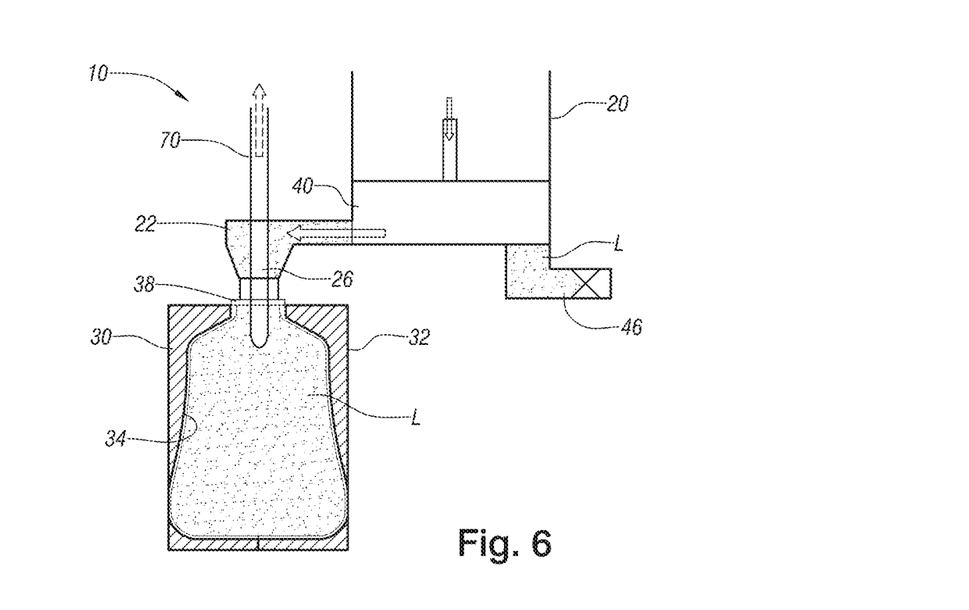
FIG. 6 is a schematic depiction of the system of FIG. 5 wherein the piston-like device has been fully actuated thereby completely transferring an appropriate volume of liquid to the newly formed container.
Figure 7:
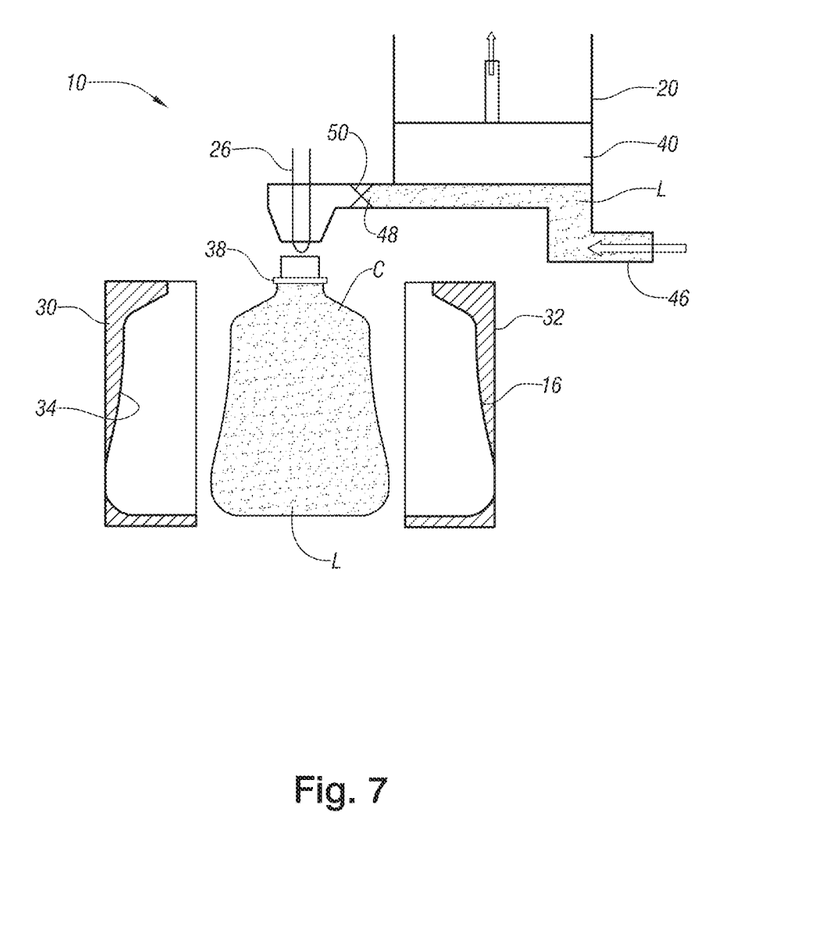
FIG. 7 is a schematic depiction of the system of FIG. 6 wherein the mold halves separate and the piston-like device begins to draw liquid into the pressure source in preparation for the next cycle.

With regard to FIGS. 1-8, a mold station 10 is provided that utilizes a final liquid commodity L to impart the pressure required to expand a preform 12 to take on the shape of a mold thus simultaneously forming and filling the resultant container C (FIG. 7).

Figure 1:
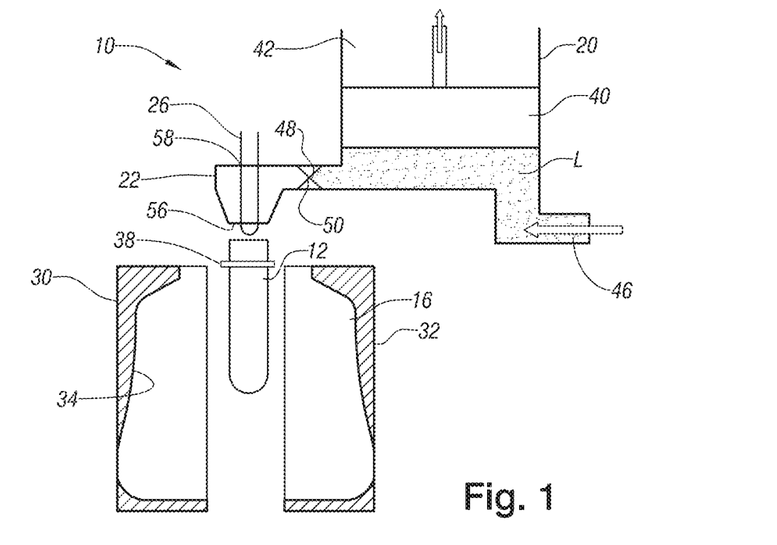
FIG. 1 is a schematic depiction of a heated preform passed into a mold station wherein a pressure source including a piston-like device begins to move, drawing liquid into the pressure source in accordance with the teachings of the present disclosure.

With initial reference to FIG. 1, the mold station 10 will be described in greater detail. The mold station 10 generally includes a mold cavity 16, a pressure source 20, a blow nozzle 22 and an optional stretch rod 26. The exemplary mold cavity 16 illustrated includes mold halves 30, 32 that cooperate to define an interior surface 34 corresponding to a desired outer profile of a blown container. The mold cavity 16 may be moveable from an open position (FIG. 1) to a closed position (FIG. 2) such that a support ring 38 of the preform 12 is captured at an upper end of the mold cavity 16.

In one example, the pressure source 20 can be in the form of, but not limited to, a filling cylinder, manifold or chamber 42 that generally includes a mechanical piston-like device 40 including, but not limited to, a piston, a pump (such as a hydraulic pump) or any other such similarly suitable device, moveable within the filling cylinder, manifold or chamber 42. The pressure source 20 has an inlet 46 for accepting liquid commodity L and an outlet 48 for delivering the liquid commodity L to the blow nozzle 22. It is appreciated that the inlet 46 and the outlet 48 may have valves incorporated thereat. The piston-like device 40 may be moveable in a first direction (upward as viewed in the figures) to draw liquid commodity L from the inlet 46 into the filling cylinder, manifold or chamber 42, and in a second direction (downward as viewed in the figures) to deliver the liquid commodity L from the filling cylinder, manifold or chamber 42 to the blow nozzle 22. The piston-like device 40 can be moveable by any suitable method such as pneumatically, mechanically, electrically (servo), or hydraulically for example. The inlet 46 of the pressure source 20 may be connected, such as by tubing or piping to a reservoir or container (not shown) which contains the final liquid commodity L. It is appreciated that the pressure source 20 may be configured differently.

The blow nozzle 22 generally defines an inlet 50 for accepting the liquid commodity L from the outlet 48 of the pressure source 20 and an outlet 56 (FIG. 1) for delivering the liquid commodity L into the preform 12. It is appreciated that the outlet 56 may define a shape complementary to the preform 12 near the support ring 38 such that the blow nozzle 22 may easily mate with the preform 12 during the forming/filling process. In one example, the blow nozzle 22 may define an opening 58 for slidably accepting the stretch rod 26 used to initiate mechanical stretching of the preform 12 in some embodiments.

In one example, the liquid commodity L may be introduced into the plastic container C during a thermal process, typically a hot-fill process. For hot-fill bottling applications, bottlers generally fill the plastic container C with a liquid or product at an elevated temperature between approximately 185° F. to 205° F. (approximately 85° C. to 96° C.) and seal the plastic container C with a closure (not illustrated) before cooling. In one configuration, the liquid may be continuously circulated within the filling cylinder, manifold or chamber 42 through the inlet 46 whereby the liquid can be heated to a preset temperature (i.e., at a heat source (not illustrated) upstream of the inlet 46), additionally the liquid can be maintained at the necessary heat by not recirculating as in similar systems but instead by use of the cooling channels in the head and the piping which would carry a fluid designed to convey heat and thus keep the liquid product at the desired temperature until the forming and filling stage is completed. In addition, the plastic container C may be suitable for other high-temperature pasteurization or retort filling processes or other thermal processes as well.

In another example, the liquid commodity L may be introduced into the plastic container C under ambient or cold temperatures. Accordingly, by way of example, the plastic container C may be filled at ambient or cold temperatures such as between approximately 32° F. to 90° F. (approximately 0° C. to 32° C.), and more preferably at approximately 40° F. (approximately 4.4° C.).

With particular reference to situations wherein a carbonated beverage is being packaged in the plastic container C, it is useful to maintain the $CO_2$ in solution for improved product packaging. That is, when a $CO_2$ beverage is warmed, or conveyed, the $CO_2$ tends to come out of solution and separate from the liquid. This causes excess gassing and degradation to the product integrity.

The system includes a saturation means or device for carbonating the liquid beverage to be packaged. Such saturation means or device can consist of a single saturation unit. Such a unit can be centrally located within the forming and filling machine or located externally from the forming machine and include piping, or other means, for transporting the saturated liquid product to the filling and forming machine. In other embodiments, multiple saturation units may be employed. A saturation unit may be paired with each molding station within the forming and filling machine and may be located prior to the filling head or located within the filling head itself. Locating the saturation unit proximate to or within the filling head will help to ensure the $CO_2$ stays in solution prior to and during the filling and forming stage.

Figure 10:
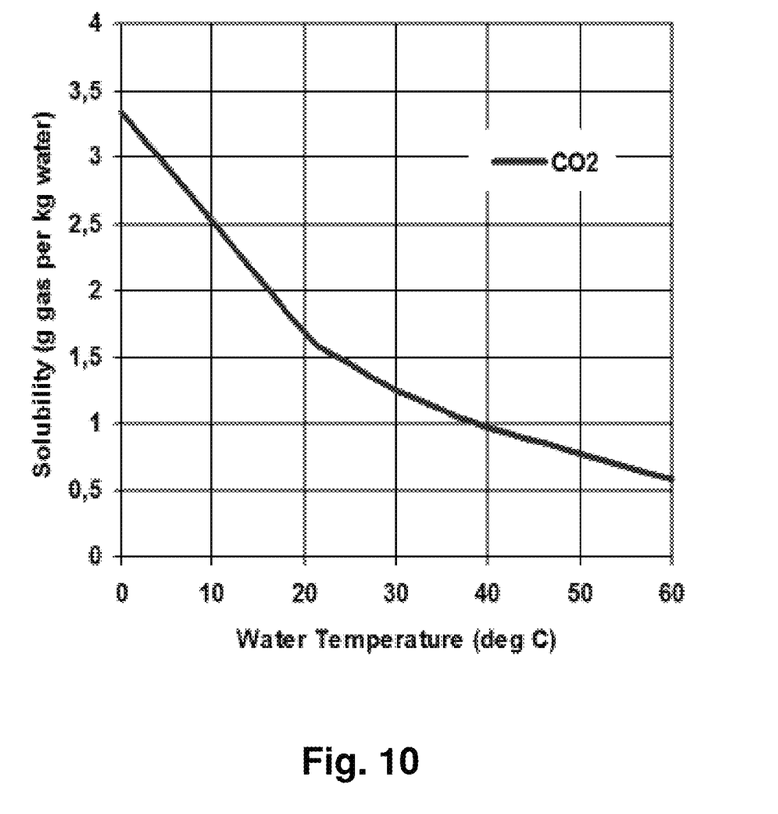
FIG. 10 is a graph illustrating the level of $CO_2$ saturation relative to water temperature.

By cooling already saturated liquid, the existing $CO_2$ level becomes more stable. The more stable solution allows greater handling and a longer filling process window. The level of $CO_2$ saturation area of stabilization is shown on the graph in FIG. 10. The further the temperature is chilled; without freezing or phase changing, the more $CO_2$ solubility will be created thus creating a more stable liquid which will add to the quality of the finished product. By having a more stable liquid this will enable a much wider processing window for the overall process.

Figure 9:
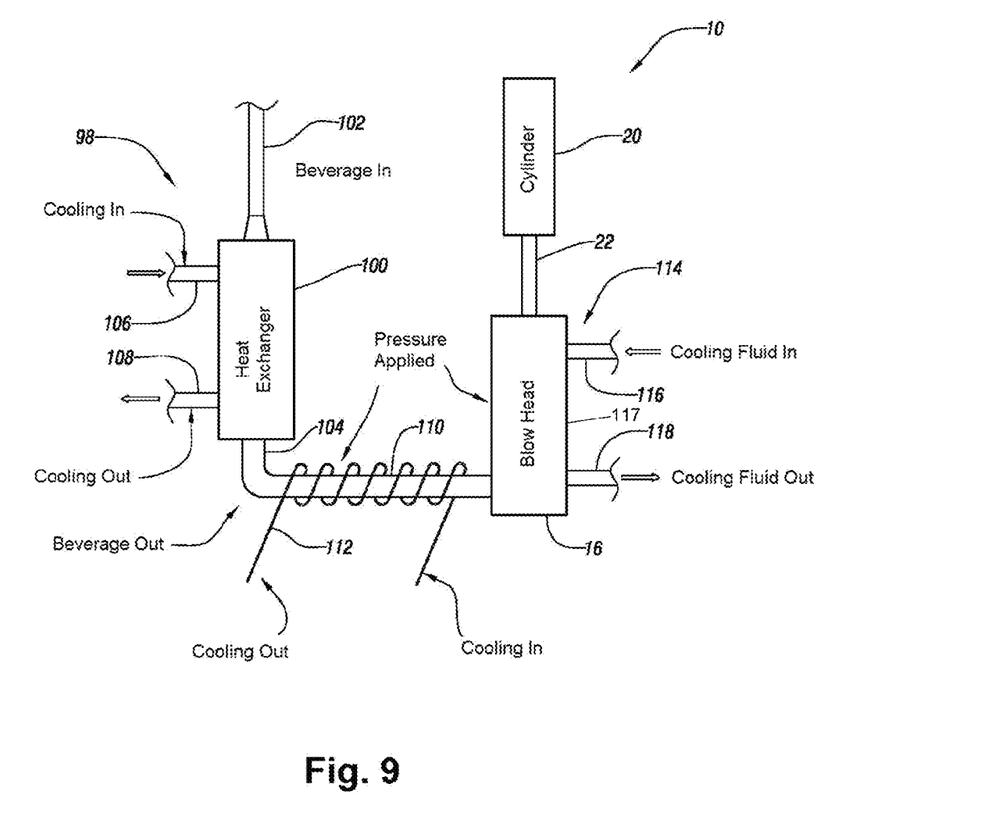
FIG. 9 is a schematic depiction of a mold filling station having a cooling system for maintaining a desire temperature of a liquid commodity to be used for molding.

In some embodiments, as illustrated in FIG. 9, the present teachings provide a heat transfer system 98 for cooling one or more sections of the mold filling station 10 of the present teachings. In some embodiments, a first heat exchanger 100 is used to cool the liquid commodity L. In some embodiments, the present teachings are adapted to cool the liquid commodity L to about 40-45° F. First heat exchanger 100 can comprise a passage for receiving a liquid to be cooled (e.g. liquid commodity L) extending from a liquid exchanger inlet 102 to a liquid exchanger outlet 104. Heat exchanger lines are provided to introduce a heat transfer fluid (e.g. liquid, coolant, etc.) to first heat exchanger 100 via an inlet 106 and outlet 108. The heat transfer fluid can flow into heat exchanger 100 to thermally absorb heat from liquid commodity L and out of heat exchanger 100 for processing.

The heat transfer system 98 can comprise, in some embodiments, a passage 110 interconnecting heat exchanger 100 to fill head 117. In some embodiments, heat transfer system 98 can further comprise a second heat exchanger 112, such as a cooling conduit, refrigeration passage, or other conventional cooling or heating system. In some embodiments, second heat exchanger 112 can further cool or heat the liquid commodity L from first heat exchanger 100 to a temperature below that of outlet 104, or can simply maintain a predetermined temperature. In some embodiments, second heat exchanger 112 cools the liquid commodity L to about 34-40° F.

Still further, in some embodiments, heat transfer system 98 can comprise a fill head cooling system 114 to maintain the fill head 117 at a predetermined temperature. Fill head cooling system 114 can comprise an inlet 116 and an outlet 118 for receiving a cooling agent. Alternatively, fill head cooling system 114 can comprise another conventional cooling system.

By cooling the liquid commodity L to below 45° F., the $CO_2$ remains within the beverage as intended. Moreover, by cooling the passage 110 and mold cavity 16, the $CO_2$ within the liquid commodity L is more likely to remain in the liquid during conveyance to the mold and during the injection and filling sequence.

In some embodiments, the liquid commodity L can be maintained under a pressure greater than the saturation pressure of the liquid to maintain the $CO_2$ in solution. In some embodiments, this is done by applying a pressure to the closed system at a position upstream of nozzle 22. This serves to further stabilize the moving and jostling liquid prior to fill. In some embodiments, this can be accomplished by applying a pre-pressure to the liquid commodity L prior to filling and also to increase the pressure within the piping to the head and subsequently the container, thus increasing the pressure upon the liquid commodity L in the piping that conveys the liquid to the head and restraining the $CO_2$ in solution. The pressure can be applied to any area between the heat exchanger 100 and piping 110, up to and including the head 16.

In some embodiments, the velocity with which the liquid commodity L is injected into the preform/container and/or the mold can generally inhibit $CO_2$ loss, even though the liquid commodity L can experience a loss in pressure during the initial stages of formation. It has been found that this velocity can be anywhere between 0.05 liters per second up to a maximum of about 6 liters per second with a preferred range of about 0.5 to 2 liters per second. The ability to have a variable control over this velocity allows for the further stabilization of the liquid towards the beginning and the end of the forming and filling stage.

Figure 2:
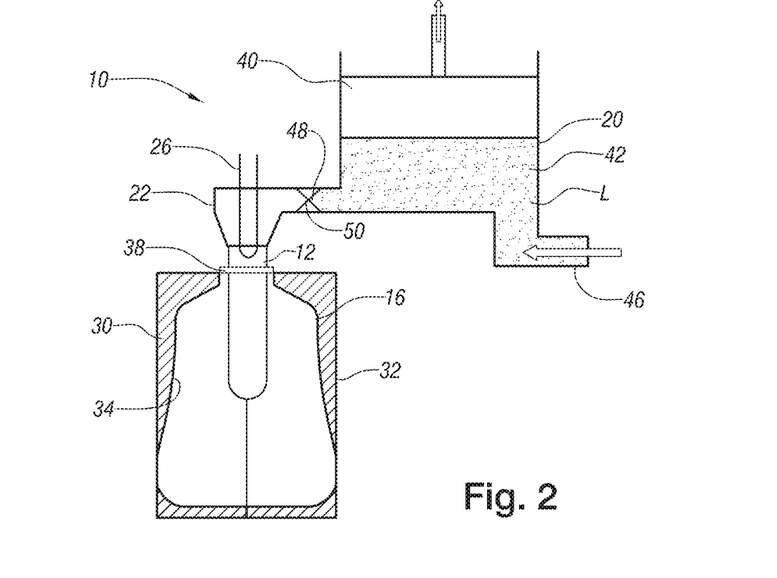
FIG. 2 is a schematic depiction of the system illustrated in FIG. 1 wherein the mold halves close around the preform.

With reference now to all figures, an exemplary method of simultaneously forming and filling the plastic container C will be described. At the outset, the preform 12 may be placed into the mold cavity 16. In one example, a machine (not illustrated) places the preform 12 heated to a temperature between approximately 190° F. to 250° F. (approximately 88° C. to 121° C.) into the mold cavity 16. As the preform 12 is located into the mold cavity 16, the piston-like device 40 of the pressure source 20 may begin to draw liquid commodity L into the filling cylinder, manifold or chamber 42 through the inlet 46. It should be recognized, however, that piston-like device 40 can begin to draw liquid commodity L into the cylinder, manifold or chamber 42 at any time after completion of the previous cycle. The mold halves 30, 32 of the mold cavity may then close thereby capturing the preform 12 (FIG. 2). The fill head 117 may form a seal at a finish of the preform 12. The mold cavity may be heated to a temperature between approximately 250° F. to 350° F. (approximately 93° C. to 177° C.) in order to impart increased crystallinity levels within the resultant container C. In another example, the mold cavity 16 may be provided at ambient or cold temperatures between approximately 32° F. to 90° F. (approximately 0° C. to 32° C.). Liquid commodity L may continue to be drawn into the filling cylinder, manifold or chamber 42 by the piston-like device 40.

Figure 3:
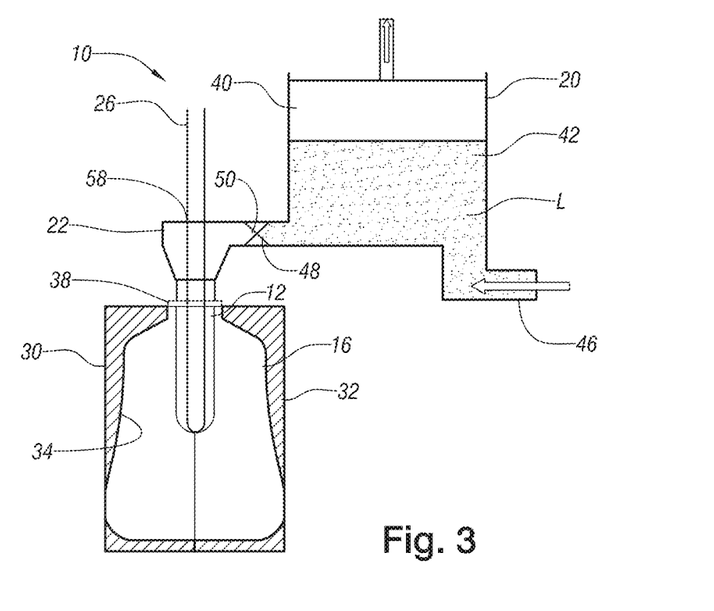
FIG. 3 is a schematic depiction of the system illustrated in FIG. 2 wherein a stretch rod may, in some embodiments, extend into the preform to initiate mechanical stretching.
Figure 4:
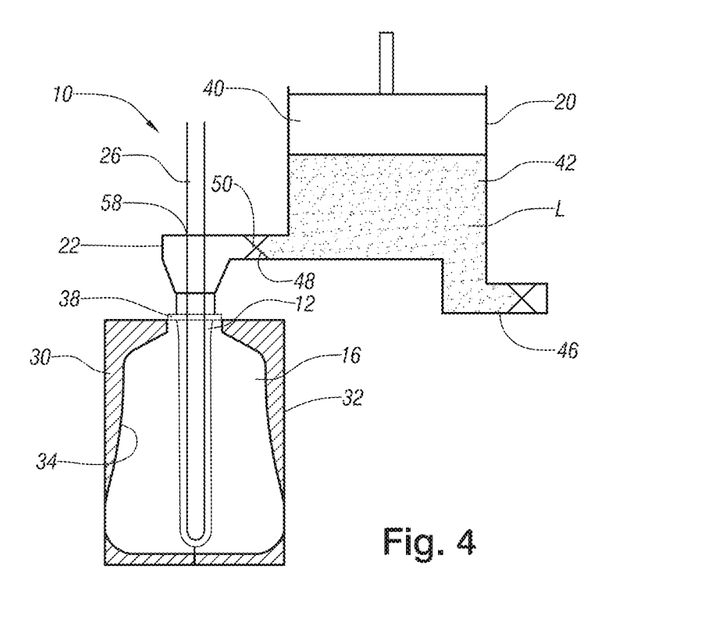
FIG. 4 is a schematic depiction of the system of FIG. 3 wherein the stretch rod stretches the preform.

Turning now to FIG. 3, the stretch rod 26 may extend into the preform 12 to initiate mechanical stretching in some embodiments. At this point, the liquid commodity L may continue to be drawn into the filling cylinder, manifold or chamber 42. With reference to FIG. 4, the stretch rod 26 continues to stretch the preform 12 thereby thinning the sidewalls of the preform 12, during this time the volume of material injected into the preform is controlled to prefill the preform in an orderly fashion so as to properly distribute the material axially within the mold cavity. The volume of liquid commodity L in the filling cylinder, manifold or chamber 42 may increase until the appropriate volume suitable to form and fill the resultant container C is reached. At this point, a valve disposed at the inlet 46 of the pressure source 20 may be closed.

With specific reference to FIG. 5, the piston-like device 40 may begin to drive downward (drive phase) to initiate the rapid transfer of liquid commodity L from the filling cylinder, manifold or chamber 42 to the preform 12. Again, the piston-like device 40 may be actuated by any suitable means such as pneumatic, mechanical, electrical, and/or hydraulic pressure. In one example, the hydraulic pressure within the preform 12 may reach between approximately 100 PSI to 600 PSI. The liquid commodity L causes the preform 12 to expand toward the interior surface 34 of the mold cavity 16.

Residual air may be vented through a passage 70 defined in the stretch rod 26 (FIG. 5). As shown in FIG. 6, the piston-like device 40 has begun its drive phase thereby transferring the appropriate volume of liquid commodity L to the newly formed plastic container C. Next, the stretch rod 26 may be withdrawn from the mold cavity while continuing to vent residual air during the filling and forming stage and up to and including the final formation of the container. The stretch rod 26 may be designed to displace a predetermined volume of liquid commodity L when it is withdrawn from the mold cavity 16 thereby allowing for the desired fill level of liquid commodity L within the resultant plastic container C and/or the desired headspace. Generally, the desired fill level and/or headspace will correspond at or near the level of the support ring 38 of the plastic container C for hot filled containers and water filled at ambient temperatures or in the shoulder area of the container for CSD applications.

Alternatively, liquid commodity L can be provided at a constant pressure or at different pressures during the molding cycle. For example, during axial stretching of the preform 12, liquid commodity L may be provided at a pressure which is less than the pressure applied when the preform 12 is blown into substantial conformity with the interior surface 34 of the mold cavity 16 defining the final configuration of the plastic container C. This lower pressure $P_1$ may be ambient or greater than ambient but less than the subsequent high pressure $P_2$. The preform 12 is axially stretched in the mold cavity 16 to a length approximating the final length of the resultant plastic container C. During or just after stretching the preform 12, the preform 12 is generally expanded radially outward under the low pressure $P_1$. This low pressure $P_1$ is preferably in the range of between approximately 100 PSI to 300 PSI and can be held for a predetermined amount of time, such as 0.1 to 0.2 seconds. Subsequently, the preform 12 is further expanded under the high pressure $P_2$ such that the preform 12 contacts the interior surface 34 of the mold halves 30, 32 thereby forming the resultant plastic container C. Preferably, the high pressure $P_2$ is in the range of approximately 400 PSI to 600 PSI and can be held for a predetermined amount of time, such as 0.1 to 0.2 seconds. As a result of the above method, the base and contact ring of the resultant plastic container C is fully circumferentially formed.

Optionally, more than one piston-like device may be employed during the formation of the resultant plastic container C. For example, a primary piston-like device may be used to generate the low pressure $P_1$ to initially expand the preform 12 while a secondary piston-like device may be used to generate the subsequent high pressure $P_2$ to further expand the preform 12 such that the preform 12 contacts the interior surface 34 of the mold halves 30, 32 thereby forming the resultant plastic container C.

With reference to FIG. 7, the fill cycle is shown completed. The mold halves 30, 32 may separate and the blow nozzle 22 may be withdrawn. The resultant filled plastic container C is now ready for post-forming steps such as capping, cooling (if necessary), labeling and packing. At this point, the piston-like device 40 may begin the next cycle by drawing liquid commodity L through the inlet 46 of the pressure source 20 in preparation for the next fill/form cycle. While not specifically shown, it is appreciated that the mold station 10 may include a controller for communicating signals to the various components. In this way, components such as, but not limited to, the mold cavity 16, the blow nozzle 22, the stretch rod 26, the piston-like device 40 and various valves may operate according to a signal communicated by the controller. It is also contemplated that the controller may be utilized to adjust various parameters associated with these components according to a given application.

It should be appreciated that in some embodiments, a movable filling cylinder, manifold, or chamber may not provide sufficient space optimization or facility efficiency. Moreover, in some embodiments, it may be difficult to obtain and/or route pressurized air or liquid from a first location to the preform shaping location.

Figure 8:
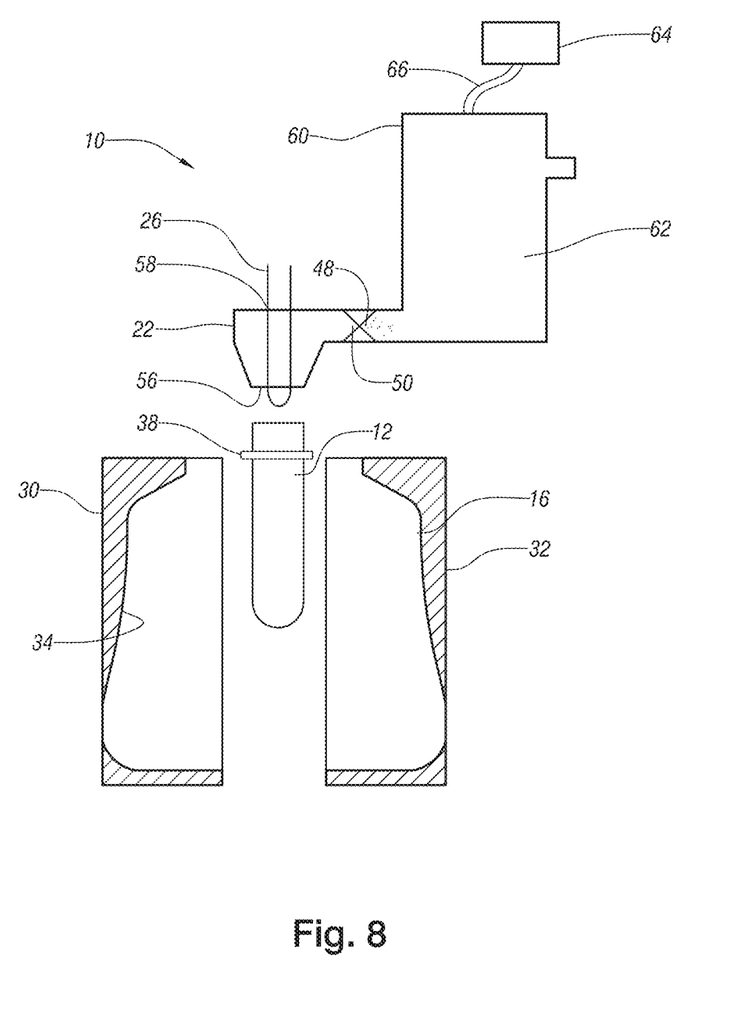
FIG. 8 is a schematic depiction of a heated preform passed into a mold station wherein a pressure source including a servo motor system in accordance with the teachings of the present disclosure.

Therefore, in other examples as illustrated in FIG. 8, the pressure source 20 can be in the form of a servo system 60 that generally includes one or more servo motors 62 being actuated by one or more controllers 64 via a line 66. The servo system 60 can be positioned adjacent to the preform shaping location. The servo system 60 can comprise inlet 46 for accepting liquid commodity L and outlet 48 for delivering the liquid commodity L to the blow nozzle 22. The servo motor 62 may be operable in a first direction to draw liquid commodity L from the inlet 46 and output the liquid commodity L from the outlet 48 to the blow nozzle 22 (i.e. forward flow). The servo motor 62, in some embodiments, may also be operable in a second direction to draw liquid commodity L from outlet 48, blow nozzle 22, and/or preform 12 (i.e. reverse flow), which will be discussed in greater detail herein.

In some embodiments, servo motor 62 can be used to overcome some of the difficulties in metering precise and/or minute quantities of commodity L. That is, servo motor 62 is precisely and variably controlled to permit precise metering of a through flow of commodity L and at a variable rate. This precise and variably control can be coupled with a feedback loop to provide active and real-time monitoring and control of the fill process, including stopping of the filling process in the event of a detected issue, such as a blow-out. In this way, the feedback loop can be formed as part of controller 64, with appropriate sensors disposed at any one of a number of locations provide sufficient data to detected a relevant parameter (e.g. pressure sensors, flow sensors, shape sensors, and the like). Because active control of the pressures and quantity of flow of commodity L is often important to the final formed product, the use of servo system 60 is particularly well suited to provide such benefits.

It should be recognized that servo system 60 may require less electrical power to operate, thereby providing additional benefits in terms of reduced electrical consumption and cost compared to current pneumatic container forming systems and methods.

While much of the description has focused on the production of PET containers, it is contemplated that other polyolefin materials (e.g., polyethylene, polypropylene, etc.) as well as a number of other thermoplastics may be processed using the teachings discussed herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for simultaneously forming and filling a container comprising:
   a mold having a mold cavity defining an internal surface and adapted to accept a preform;
   a heat transfer system cooling or heating at least one of a first liquid and said mold to maintain a desired saturation of gas in solution in said first liquid, said heat transfer system including a molding heat transfer system operably coupled to a filling head to cool or heat said filling head directly;
   a pressure source urging said first liquid toward the preform; and
   a blow nozzle adapted to receive the first liquid from the pressure source and transfer the first liquid at a pressure into the preform thereby urging the preform to expand toward the internal surface of the mold cavity and create a resultant container, wherein the first liquid remains within the container as an end product.

2. The system for simultaneously forming and filling a container according to claim 1 wherein said heat transfer system comprises:
   a first heat exchanger operably coupled to said filling head for cooling or heating said first liquid.

3. The system for simultaneously forming and filling a container according to claim 2 wherein said heat transfer system further comprises:
   a second heat exchanger disposed between said first heat exchanger and said filling head.

4. The system for simultaneously forming and filling a container according to claim 1, further comprising a servo motor system including at least one servo motor and a controller, wherein the at least one servo motor is variably controlled.

5. The system for simultaneously forming and filling a container according to claim 1 wherein the first liquid is transferred into the preform at a temperature between approximately 32° F. (0° C.) and 90° F. (32° C.).

6. The system for simultaneously forming and filling a container according to claim 1 wherein the mold cavity is at a temperature between approximately 32° F. (0° C.) to 90° F. (32° C.).

7. The system for simultaneously forming and filling a container according to claim 1 wherein the mold cavity is at a temperature between approximately 165° F. (74° C.) to 220° F. (104° C.).

8. The system for simultaneously forming and filling a container according to claim 1 wherein the first liquid is transferred into the preform at a pressure between approximately 100 PSI and 600 PSI.

9. The system for simultaneously forming and filling a container according to claim 1, further comprising:
   a saturation device supplying said first liquid having said desired saturation of gas in solution.

10. The system for simultaneously forming and filling a container according to claim 9 wherein said saturation device supplies said first liquid having a desired saturation of $CO_2$ in solution.

11. A system for simultaneously forming and filling a container comprising:
    a mold having a mold cavity defining an internal surface and adapted to accept a preform;
    a heat transfer system cooling or heating at least one of a first liquid and said mold, said heat transfer system including a first heat exchanger operably coupled to a filling head for cooling or heating said first liquid and a second heat exchanger disposed between said first heat exchanger and said filling head;
    a pressure system exerting a pressure upon said first liquid to maintain a desired saturation of gas in solution in said first liquid;
    a pressure source urging said first liquid toward the preform; and
    a blow nozzle adapted to receive the first liquid from the pressure source and transfer the first liquid at a pressure into the preform thereby urging the preform to expand toward the internal surface of the mold cavity and create a resultant container, wherein the first liquid remains within the container as an end product.

12. The system for simultaneously forming and filling a container according to claim 11, further comprising a servo motor system including at least one servo motor and a controller, wherein the at least one servo motor is variably controlled.

13. The system for simultaneously forming and filling a container according to claim 11, further comprising:
    a saturation device supplying said first liquid having said desired saturation of gas in solution.

14. A system for simultaneously forming and filling a container comprising:
    a mold having a mold cavity defining an internal surface and adapted to accept a preform;
    a heat transfer system cooling or heating at least one of a first liquid and said mold, said heat transfer system including a first heat exchanger operably coupled to a filling head for cooling or heating said first liquid, and a second heat exchanger disposed between said first heat exchanger and said filling head;
    a pressure source urging said first liquid toward the preform at a velocity sufficient to maintain a desired saturation of gas in solution in said first liquid; and
    a blow nozzle adapted to receive the first liquid from the pressure source and transfer the first liquid at a pressure into the preform thereby urging the preform to expand toward the internal surface of the mold cavity and create a resultant container, wherein the first liquid remains within the container as an end product.

15. A system for simultaneously forming and filling a container comprising:

a mold having a mold cavity defining an internal surface and adapted to accept a preform;

a heat transfer system cooling or heating at least one of a first liquid and said mold, said heat transfer system including a first heat exchanger operably coupled to said filling head for cooling or heating said first liquid, and a second heat exchanger disposed between said first heat exchanger and said filling head;

a pressure source urging said first liquid toward the preform;

means for maintaining a desired saturation of gas in solution in said first liquid; and a blow nozzle adapted to receive the first liquid from the pressure source and transfer the first liquid at a pressure into the preform thereby urging the preform to expand toward the internal surface of the mold cavity and create a resultant container, wherein the first liquid remains within the container as an end product.

16. A system for simultaneously forming and filling a container comprising:

a mold having a mold cavity defining an internal surface and adapted to accept a preform;

a heat transfer system cooling or heating at least one of a first liquid and said mold to maintain a desired saturation of gas in solution in said first liquid, said heat transfer system including a first heat exchanger operably coupled to a filling head for cooling or heating said first liquid and a second heat exchanger disposed between said first heat exchanger and said filling head;

a pressure source urging said first liquid toward the preform; and a blow nozzle adapted to receive the first liquid from the pressure source and transfer the first liquid at a pressure into the preform thereby urging the preform to expand toward the internal surface of the mold cavity and create a resultant container, wherein the first liquid remains within the container as an end product.

17. The system for simultaneously forming and filling a container according to claim 13 wherein said saturation device supplies said first liquid having a desired saturation of $CO_2$ in solution.

* * * * *